US012746701B2

(12) United States Patent
Whitelaw et al.

(10) Patent No.: US 12,746,701 B2
(45) Date of Patent: Sep. 29, 2026

(54) METHOD FOR CUTTING A MOVING WEB OF MATERIAL

(71) Applicant: ALLSTEIN GMBH, Herford (DE)

(72) Inventors: Gordon Whitelaw, Bielefeld (DE); Thomas Haecker, Marienfeld (DE)

(73) Assignee: ALLSTEIN GMBH, Herford (DE)

( * ) Notice: Subject to any disclaimer, the term of this patent is extended or adjusted under 35 U.S.C. 154(b) by 133 days.

(21) Appl. No.: 18/775,586

(22) Filed: Jul. 17, 2024

(65) Prior Publication Data

US 2025/0042052 A1 Feb. 6, 2025

(30) Foreign Application Priority Data

Aug. 2, 2023 (DE) ......................... 102023120508.0

(51) Int. Cl.

*B26D 1/40* (2006.01)
*B26D 5/02* (2006.01)
*B26D 5/16* (2006.01)
*B26D 7/10* (2006.01)

(52) U.S. Cl.

CPC ............... *B26D 1/405* (2013.01); *B26D 5/02* (2013.01); *B26D 5/16* (2013.01); *B26D 7/10* (2013.01)

(58) Field of Classification Search

CPC ...................................................... B26D 1/405
See application file for complete search history.

(56) References Cited

U.S. PATENT DOCUMENTS

| | | | | |
|---|---|---|---|---|
| 4,240,312 A * | 12/1980 | Ward, Sr. | B26D 7/20 83/311 |
| 4,530,265 A * | 7/1985 | Lee | B26D 1/565 83/337 |
| 5,788,999 A * | 8/1998 | Mizuno | B26F 1/02 425/395 |
| 2004/0035521 A1* | 2/2004 | Nakakado | B65H 35/04 156/256 |
| 2008/0141838 A1* | 6/2008 | Sussmeier | B26D 5/00 83/396 |
| 2010/0101386 A1* | 4/2010 | Jackson | B26F 1/0092 83/287 |
| 2010/0199822 A1* | 8/2010 | De Marco | B26D 5/32 83/331 |

(Continued)

FOREIGN PATENT DOCUMENTS

| | | | |
|---|---|---|---|
| DE | 112021004640 T5 | 7/2023 | |
| FR | 2511636 A1 * | 2/1983 | B27L 5/08 |
| WO | 2022/111869 A1 | 6/2022 | |

*Primary Examiner* — Sean M Michalski
(74) *Attorney, Agent, or Firm* — Richard M. Goldberg

(57) ABSTRACT

A method for cutting a running web includes the steps guiding the web over a circumferential surface of an abutment drum; rotating a blade, that extends in the axial direction of the abutment drum, about an axis of rotation parallel to the axis of the abutment drum; holding the blade in a retracted position in which a cutting edge of the blade is spaced apart from the web on the abutment drum; impacting the blade against the web and the surface of the abutment drum at a time when the blade passes through a plane that contains the axis of the abutment drum and the axis of rotation, supporting a knife shaft carrying the blade in an oscillating crank which in turn is mounted on a rotary eccentric, and controlling the impact movement of the blade by controlling the drive of the eccentric.

9 Claims, 4 Drawing Sheets

(56) References Cited

U.S. PATENT DOCUMENTS

| | | | | |
|---|---|---|---|---|
| 2013/0269493 | A1* | 10/2013 | Douillard | B26D 5/02<br>83/346 |
| 2014/0109736 | A1* | 4/2014 | Schneider | B26D 1/405<br>83/13 |
| 2023/0381992 | A1* | 11/2023 | Whitelaw | B26D 5/16 |

* cited by examiner

METHOD FOR CUTTING A MOVING WEB OF MATERIAL

BACKGROUND OF THE INVENTION

The invention relates to a method for cutting a running web, comprising the steps of:

- guiding the web over a circumferential surface of an abutment drum;
- rotating a blade, that extends in the axial direction of the abutment drum, about an axis of rotation parallel to the axis of the abutment drum;
- holding the blade in a retracted position in which a cutting edge of the blade is spaced apart from the web on the abutment drum; and
- impacting the blade against the web and the surface of the abutment drum at a time when the blade passes through a plane that contains the axis of the abutment drum and said axis of rotation.

If an endless web, e.g. a printed substrate web which exits from a rotary printing machine, and is wound into a coil, the diameter of the coil gradually increases, and when a certain maximum diameter has been reached, it is necessary to cut the web and to redirect the subsequent part of the web to another reel.

From WO 2022/111869 A1, a method of the type mentioned above is known in which the blade is held in a pre-tensioned state and is then suddenly released.

SUMMARY OF THE INVENTION

The object of the invention is to better control the impact movement of the blade.

In order to achieve this object, the invention proposes a method in which a knife shaft that carries the blade is supported in an oscillating crank which in turn is mounted on a rotary eccentric, and in which the impact movement of the blade is controlled by controlling the drive of the eccentric.

The invention has the advantage that the rotary movement of the eccentric controls not only the feed movement of the blade towards the web and the abutment drum but also the subsequent retraction movement. This enables a smoother transition between the feed and retraction movements. In addition, it is ensured with simple means that the reversal of the movement of the blade takes place exactly in the position in which the blade has cut through the web but has not yet cut into the abutment drum and caused damage to it. It has been found that a sufficient speed of the impact movement can be achieved by choosing an appropriate rotation speed of the eccentric. The exact timing of the impact movement can also be precisely controlled via the eccentric drive.

Although the claims specify that the axis of rotation of the blade is parallel to the axis the abutment drum is parallel, no high accuracy of parallelism is required. For example, an angular deviation of up to 5° may be acceptable.

Useful details and further developments of the invention are indicated in the dependent claims.

Depending on the material of the web to be cut, the cutting process can be optimized by heating the blade to a suitable temperature.

To achieve a straight-line movement of the knife shaft and the blade, the knife shaft may be held in a linear guide.

The drive of the eccentric can be controlled, for example, by a servo motor or a stepper motor.

BRIEF DESCRIPTION OF THE DRAWINGS

In the following, an embodiment example will be described by reference to the drawings, wherein:

FIG. 4 the winder and the cutting unit in a later operating state.

DETAILED DESCRIPTION

Figure 1:
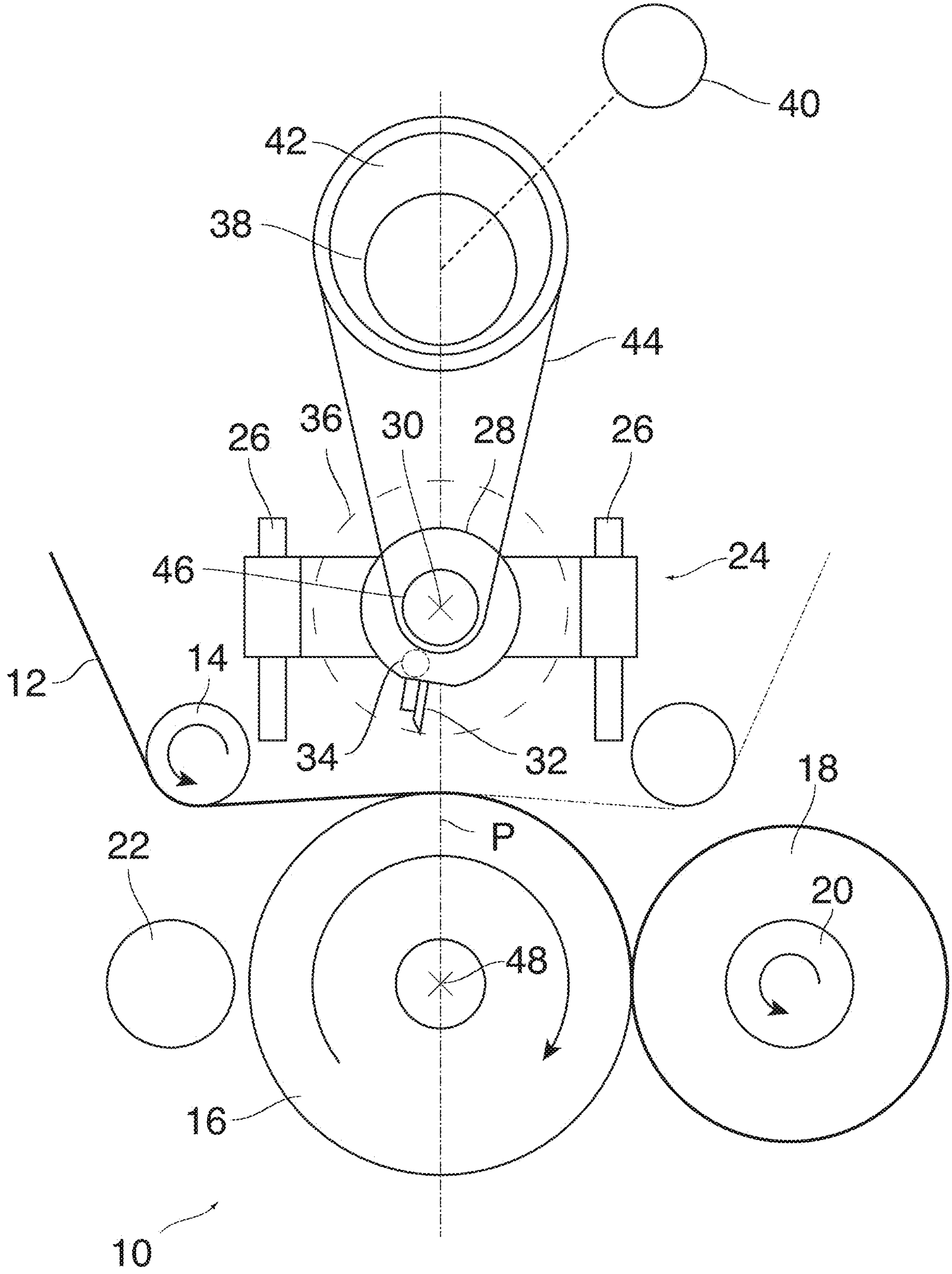
FIG. 1 is a schematic side view of a winder with a cutting unit.

FIG. 1 schematically shows a winder 10 which may be installed in a rotary printing machine and serves to wind up an endless web 12 of a print substrate. The web 12 runs over a deflection roller 14 and is then guided over a part of a smooth peripheral surface of an abutment drum 16 and finally onto a coil 18 on a first winding core 20. The abutment drum, the first winding core 20 and a second winding core 22 are rotatable in a machine frame. The peripheral surface of the abutment drum may be smooth or may be grooved, e.g. in the form of a diamond pattern. The winding cores 20, 22 are movable in radial direction of the abutment drum.

Above the abutment drum 16, a cutting gate 24 is arranged, which is guided for a vertical movement in the machine frame. The cutting frame and the abutment drum together form a cutting unit for cutting the web 12. The cutting gate is guided on guide rods 26 and forms a bearing for the ends of a knife shaft 28 which is rotated about a rotation axis 30 by means of a drive not shown. A blade 32 is rigidly mounted on the knife shaft 28 and extends in the longitudinal direction of the shaft and protrudes radially from the surface of the shaft. A blade holder inside the knife shaft 28 has an integrated heating cartridge 34 which serves to heat the blade 32 to a temperature (e.g. 150° C.) required for the material to be cut. When the knife shaft 28 and the blade 32 rotate about the axis of rotation 30, the cutting edge of the blade 32 moves on a circular trajectory 36. In the state shown in FIG. 1, the lower apex of this trajectory has a significant vertical distance to the upper apex of the abutment drum 16.

Above the knife shaft 28 and parallel to it runs an eccentric shaft 38 which, by means of a servo motor 40, is rotatable about a frame-fixed axis, and carries two eccentrics 42, on which two arms of an oscillating crank 44 are supported (in the drawing, only one of the arms is visible). The entire cutting frame 24 is suspended from the oscillating crank 44. In the example shown, the knife shaft 28 has, at each end, a bearing pin 46 which is supported in an arm of the oscillating crank 44 and at the same time can also serve to support the knife shaft in the cutting gate 24. In FIG. 1, the eccentrics 42 are in an angular position in which the oscillating crank and the cutting gate assume their highest position.

In the condition shown in FIG. 1, while the web 12 is wound onto the winding core 20, both the knife shaft 28 and the eccentric shaft 38 are stationary so that the cutting unit is inactive, except that the abutment drum 16 is involved in guiding the web onto the reel 18.

As the winding operation proceeds, the diameter of the coil 18 increases gradually, and as a result the winding core 20 must be moved laterally away from the axis of the bearing drum 16. When the diameter of the coil 18 exceeds a certain maximum value, it is necessary to cut the web 12 and to guide the subsequent part of the web onto the empty second winding core 22, so as to start forming a new coil on this winding core.

Shortly before this point is reached, the knife shaft 28 is driven for rotation and accelerated to an angular velocity at which the peripheral speed the cutting edge of the blade 32 approximately equals the transport speed of the web 12. At an appropriate time, the eccentric shaft 38 is also set into rotation.

Figure 2:
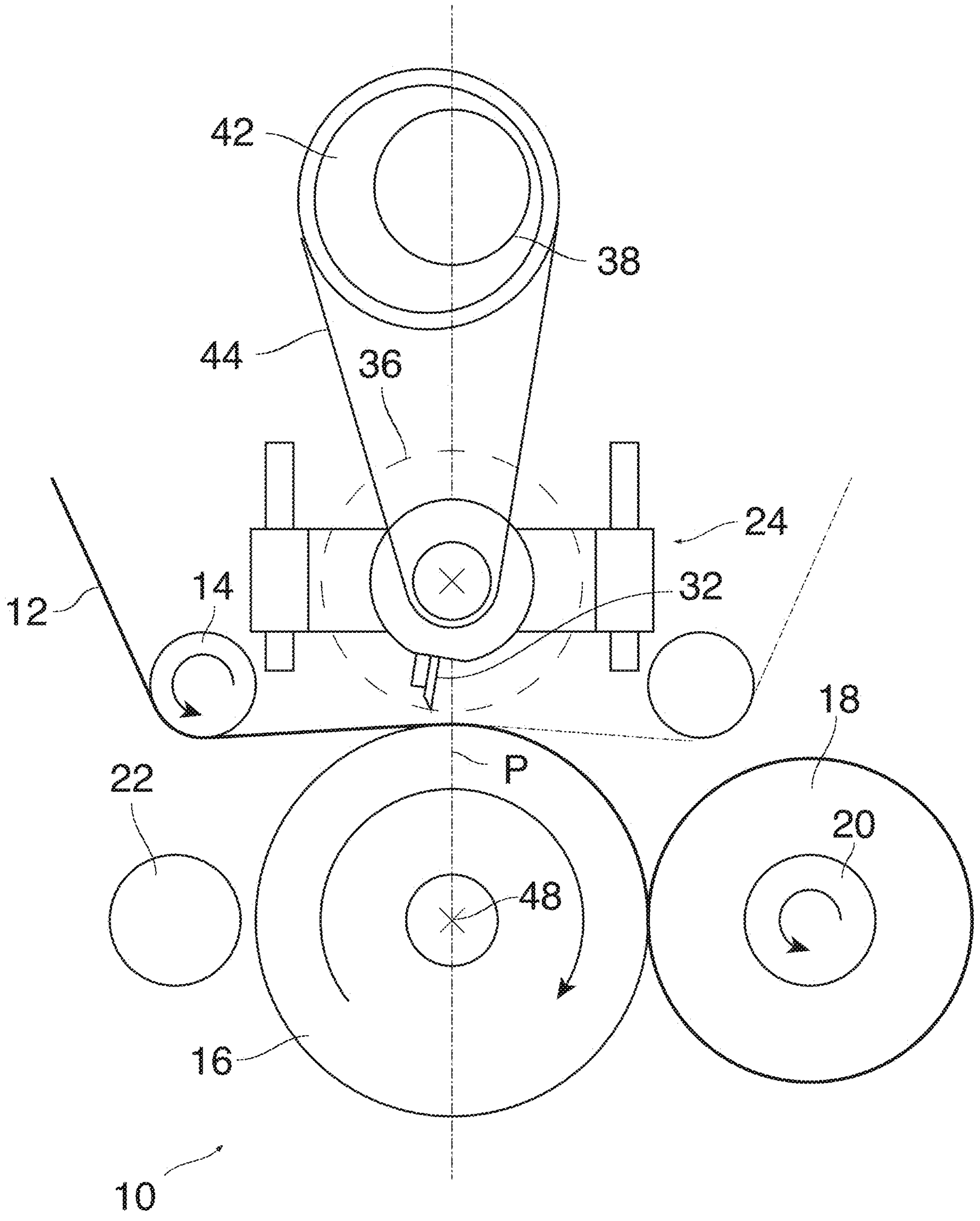
FIG. 2 the winder and the cutting unit in a state in which a cutting operation is being prepared.

FIG. 2 shows the cutting unit in a stage just before the blade 32 reaches the plane P which includes both, the axis 48 of the abutment drum 16 and the axis of rotation 30. At this point in time, the peripheral speed of the cutting edge of the blade 32 on the trajectory 36 has almost reached the transport speed of the web 12 so that there is at most a minor relative movement in the horizontal direction between the blade and the 16 web 12. Due to the rotation of the eccentric 42, the oscillating crank 44 and the cutting gate 24 are lowered so far that the trajectory 36 almost touches the peripheral surface of the abutment drum 16. The angular acceleration of the eccentric shaft 38 is controlled by the servo motor 40 such that that the oscillating crank reaches its lowest position exactly at the moment when the cutting edge of the blade 32 passes the plane P, and that the angular velocity of the eccentric shaft 38 at this time (or during a period shortly before and shortly after this point in time) is at maximum. This causes the blade 32 to be moved at high speed onto web 12 in order to cut it.

Figure 3:
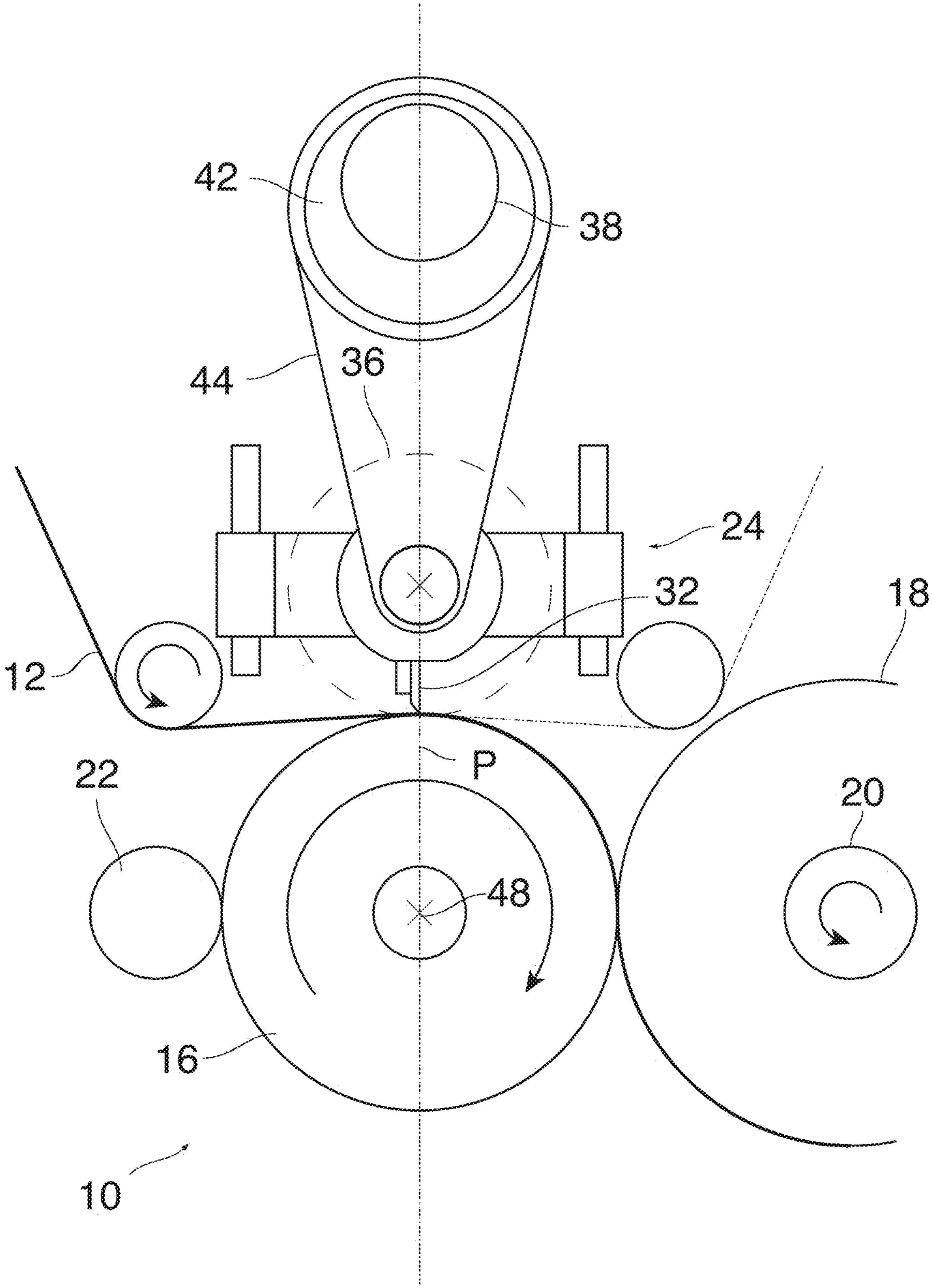

FIG. 3 shows the point in time at which the blade 32 has reached the plane P and the cutting edge pierces the web 12. Since the oscillating crank 44 has reached its lowest point, the downward movement of the cutting gate 24 reverses at this point in time into an upward movement so that the cutting edge of the blade 32 in its lowest position reaches a point where it has cut through the web 12 but still does not cut significantly into the peripheral surface of the abutment drum 16. In this way, the blade that is heated by the heating cartridge 34 makes a clean cut without severing the abutment drum (which can optionally have an elastic coating). In this process, the downward movement of the blade 32 is smoothly converted into an upward movement.

Figure 4:
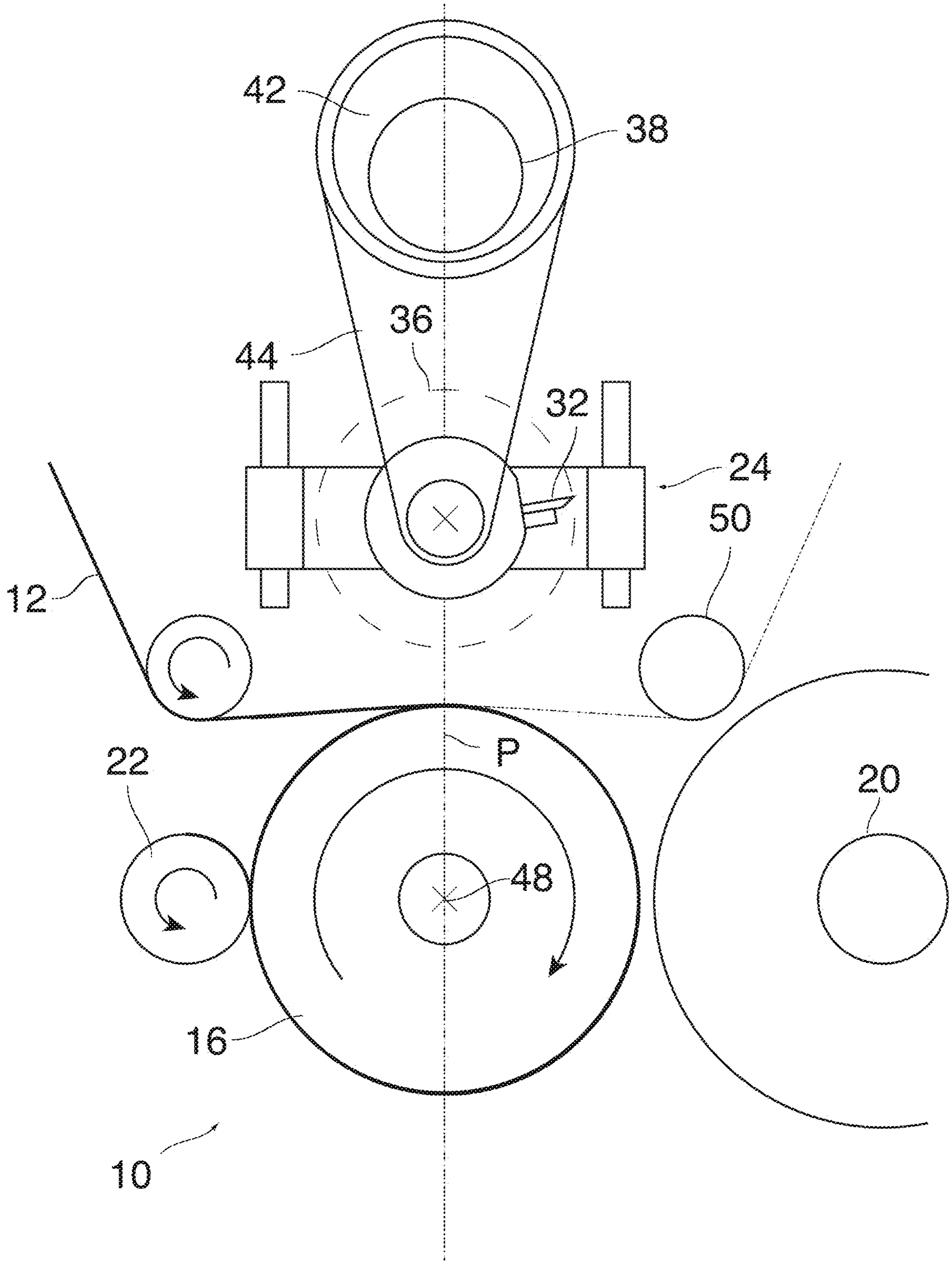
FIG. 4 the winder and the cutting unit in a state in which the cutting operation proceeds.

FIG. 4 shows the situation at a slightly later point in time. The knife shaft 28 has continued its rotation and is then stopped in a suitable position so that it is ready for another cutting process. The angular velocity of the eccentric shaft is reduced such that the eccentric 42 comes to rest again in the position shown in FIG. 1. The first winding core 20, which carries the coil 18, has been withdrawn from the abutment drum 16, while the second winding core 22 (on to which an adhesive strip may have been applied for attaching the leading edge of the web 12) has been placed against the peripheral surface of the abutment drum 16 at a time when the leading edge of the cut web 12 reaches the gap between the winding core 22 and the abutment drum, so that a new coil is now formed on the second winding core 22. During the time in which the leading edge of the web moves from the cutting position (at the upper apex of the abutment drum) to the gap with the second winding core 22, the web has been attracted to the peripheral surface of the drum by a suction pressure that was applied to the web via perforations in the surface the drum.

The coil 18 is released from the first winding core 20, and the first winding core is again adjusted towards the abutment drum 16 so that it is ready to take up another coil. When the coil formed on the second winding core 22 has reached its maximum diameter, the cutting unit is activated so that a new coil can be started on the first winding core 20.

While in the example described here the winding cores 20 and 22 rotate counterclockwise, it is also possible to operate the winder 10 in a mode in which the winding cores rotate clockwise. In this operating mode, the web 12 is fed from the opposite side via a deflection roller 50 54, and the rotation directions of the abutment drum 16 and the knife shaft 30 are reversed.

What is claimed is:

1. A method for cutting a running web, comprising the steps:

guiding the web over a circumferential surface of an abutment drum;

rotating a blade, that extends in the axial direction of the abutment drum, about an axis of rotation parallel to the axis of the abutment drum;

holding the blade in a retracted position in which a cutting edge of the blade is spaced apart from the web on the abutment drum;

impacting the blade against the web and the surface of the abutment drum at a time when the blade passes through a plane that contains the axis of the abutment drum and said axis of rotation;

supporting a knife shaft carrying the blade in a crank-rocker which in turn is mounted on a rotary eccentric; and controlling the impact movement of the blade by controlling a drive of the eccentric such that the eccentric moves with an angular acceleration and the angular velocity of the eccentric is at a maximum when the blade passes through said plane.

2. The method according to claim 1, further comprising the step of controlling a peripheral speed of the blade such that, at the time when the blade hits the web, it corresponds to the transport speed of the web.

3. The method according to claim 1, further comprising the steps of:

supporting the knife shaft in a cutting gate, and guiding the cutting gate for linear motion during the impact movement.

4. The method according to claim 1, wherein the eccentric is mounted on an eccentric shaft, and further comprising the step of driving the eccentric shaft by one of:

a servo motor or a stepper motor.

5. The method according to claim 1, further comprising the step of keeping the blade at an elevated temperature.

6. A cutting unit comprising:

a blade for cutting a running web, a rotating abutment drum having a smooth peripheral surface provided for supporting the web, the blade being is arranged to be driven to rotate about an axis of rotation which is parallel to an axis of the abutment drum, a knife shaft for carrying the blade, a rotary eccentric, and a crank-rocker for supporting the knife shaft, and which is rotatably mounted on the rotary eccentric such that the eccentric moves with an angular acceleration and the angular velocity of the eccentric is at a maximum when the blade passes through said plane.

7. The cutting unit according to claim 6, further comprising a cutting gate for supporting the knife shaft, wherein the cutting gate is suspended from the oscillating crank and further comprising guide rods for linearly guiding the cutting gate.

8. The cutting unit according to claim 6, further comprising a heating system which is arranged to heat the blade.

9. A Winder for winding a web onto a coil, comprising a cutting unit according to claim 6.

* * * * *